United States Patent [19]
Yamamoto et al.

[11] 4,456,719
[45] Jun. 26, 1984

[54] FLAME RETARDING THERMOPLASTIC POLYESTER

[75] Inventors: Yoshiyuki Yamamoto, Suzuka; Toshihide Inoue, Ichinomiya; Masana Yanagi, Nagoya, all of Japan

[73] Assignee: Toray Industries, Inc., Tokyo, Japan

[21] Appl. No.: 481,798

[22] Filed: Apr. 4, 1983

Related U.S. Application Data

[63] Continuation of Ser. No. 299,494, Sep. 4, 1981, abandoned.

[30] Foreign Application Priority Data

Jan. 8, 1982 [JP]  Japan ............................ 57-130784

[51] Int. Cl.$^3$ ................................. C08K 5/15
[52] U.S. Cl. ................................. 524/114; 524/411; 524/412
[58] Field of Search ................ 524/411, 412, 114; 525/177, 111, 121, 165, 166

[56] References Cited

U.S. PATENT DOCUMENTS

| | | | |
|---|---|---|---|
| 4,102,853 | 7/1978 | Kawamura et al. | 524/425 |
| 4,107,231 | 8/1978 | Wurmb et al. | 524/412 |
| 4,151,223 | 4/1979 | Neuberg et al. | 524/409 |
| 4,271,274 | 6/1981 | Schmidt et al. | 525/111 |

FOREIGN PATENT DOCUMENTS

| | | |
|---|---|---|
| 2502835 | 7/1976 | Fed. Rep. of Germany . |
| 54-158453 | 12/1979 | Japan . |
| 55-069630 | 5/1980 | Japan . |
| 55-092759 | 7/1980 | Japan . |

*Primary Examiner*—Veronica P. Hoke
*Attorney, Agent, or Firm*—Wegner & Bretschneider

[57] ABSTRACT

A flame retarding thermoplastic polyester composition superior in thermal stability, fluidity and mechanical properties, and prepared by mixing (a) halogen containing polystyrene and/or halogen containing poly-α-methylstyrene, (b) antimony trioxide and (c) epoxy compound with respect to thermoplastic polyester is disclosed.

9 Claims, No Drawings

FLAME RETARDING THERMOPLASTIC POLYESTER

This application is a continuation of U.S. application Ser. No. 299,494, filed Sept. 4, 1981, now abandoned.

BACKGROUND OF THE INVENTION

1. Field of the Invention

The present invention relates to a flame retarding polyester composition superior in thermal stability, fluidity and mechanical properties.

2. Description of the Prior Art

Thermoplastic polyesters such as polyethylene terephthalate, polybutylene terephthalate, polyethylene naphthalate, polycyclohexane dimethylene terephthalate, etc. have found applications in mechanical components, electrical parts, motor vehicle parts and the like. On the other hand, for industrial materials as described above, safety against flames, i.e. flame retardancy, has been strongly required. Besides balancing general chemical and physical properties, with the further requirement that, during injection molding of molded items or heat treatment thereof, the flame retarding agent does not bleed out onto the surfaces of the molded items.

Conventionally, as non-bleed type flame retarding agents for the thermoplastic polyester, there have been proposed polymeric flame retarding agents such as a halogenated polycarbonate (Japanese Laid Open Patent Application Tokkaisho No. 48-52834) and a halogenated epoxy resin (Japanese Patent Publication Tokkosho No. 53-18068), etc. Although the known flame retarding agents as described above, which are mainly composed of tetrabromobisphenol A, are superior in compatibility with respect to polyester, they tend to deteriorate the crystallinity inherent in polyester, thus adversely affecting the mechanical properties, thermal stability, chemical resistance, and electrical properties, etc. of the polyester itself.

Meanwhile, there have also been introduced halogen containing polystyrene and halogen containing poly-α-methylstyrene, together with their applications to thermoplastic polyesters (Plastic Technology, July, 1980, pages 71-74), but in the polyester compounds in which the above flame retarding agents are mixed, marked deterioration of thermal stability and mechanical properties is noticed, with simultaneous reduction of fluidity, thus resulting in poor moldability.

Therefore, it is desirable to develop polyester compounds which exhibit superior flame retarding and favorable mechanical properties and which also are free of disadvantageous bleeding of the flame retarding agent.

SUMMARY OF THE INVENTION

Accordingly, an object of the present invention is to provide a flame retarding polyester compound which is superior in balancing of thermal stability, fluidity and mechanical properties, without bleeding-out of the flame retarding agent.

It has been found that, by employing halogen containing polystyrene and/or halogen containing poly-α-methylstyrene as flame retarding agents, with a further addition thereto of epoxy compounds, a flame retarding polyester compound having superior flame retardancy and also improved thermal stability and fluidity, and yet favorably maintaining the mechanical properties of polyester itself, can be obtained.

More specifically, the present invention provides a flame retarding polyester composition which comprises (a) 3 to 45 parts by weight of halogen containing polystyrene and/or halogen containing poly-α-methylstyrene represented by the general formula (I) given below, (b) 1 to 20 parts by weight of antimony trioxide and (c) 0.1 to 10 parts by weight of epoxy compound which are mixed to 100 parts by weight of thermoplastic polyester,

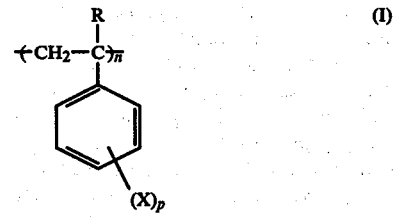

(wherein R is a hydrogen atom or methyl group, X is a bromine or chlorine atom, P is an integer of 1 to 5, and n represents an integer larger than 2).

DESCRIPTION OF THE PREFERRED EMBODIMENTS

The main components of the thermoplastic polyesters employed in the practice of the present invention are polymers or copolymers prepared by condensing a dicarboxylic acid (or an ester forming compound thereof) with a glycol (or an ester forming compound thereof).

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis-(p-carboxyphenyl) methane, 1,2-bis(p-carboxyphenoxy) ethane, anthracene dicarboxylic acid, 4,4'-diphenyl dicarboxylic acid, 4,4'-diphenylether dicarboxylic acid, aliphthatic dicarboxylic acids such as adipic acid, sebacic acid, azelaic acid, cycloaliphatic dicarboxylic acids such as 1,3-cyclohexane dicarboxylic acid, 1,4-cyclohexane dicarboxylic acid and the like, or ester-forming compounds thereof.

The glycols suitable for preparing polyesters in accordance with the present invention include aliphatic diols having 2 to 10 carbon atoms such as ethylene glycol, 1,3-propylene glycol, 1,4-butanediol, neopentylglycol, 1,5-pentanediol, 1,6-hexanediol, decamethylene glycol, cyclohexanediol, long chain glycols having molecular weights on the order of about 400–6,000 such as poly(ethylene glycol), poly(1,3-propylene glycol), poly(tetramethylene glycol) and the like. Mixtures of these glycols can also be employed.

Preferable polyesters are poly(ethylene terephthalate), poly(propylene terephthalate), poly(butylene terephthalate), poly(butylene sebacate), poly(ethylene 2,6-naphthalate), and copolyesters such as poly(ethylene isophthalateterephthalate) (PETI), poly(butylene terephthalate-isophthalate) (PBTI) and the like. Among these poly(ethylene terephthalate) and poly(butylene terephthalate) are more preferably used because of their excellent mechanical properties.

Furthermore, mixtures of the above polyesters and copolyesters may also be employed as desired, and even a mixture of other organic polymer less than 30 parts by weight, with respect to 100 parts by weight of those polyesters, can be applied to the present invention.

As suitable organic copolymers there may be mentioned polyethylenes, polypropylenes, ethylene-vinylacetate-copolymers, ethylene-acrylic estercopolymers, ethylene-propylene-copolymers, butyl rubber, chlorinated polyethylenes, chlorinated polypropylenes, polybutadiene, polystyrene, styrene-acrylonitrile-butadiene resins, styrene-polyphenylene oxide resins, styrene-acrylonitrile copolymers, polyvinyl chlorides, polyoxymethylenes, polyamides, polyphenylene oxides, polytetrafluoroethylenes, ethylene tetafluoroethylene copolymers, polycarbonates, etc.

The second component (a) to be employed as the flame retarding agent in the present invention is the halogen containing polystyrene and/or halogen containing poly-α-methylstyrene represented by the general formula (I) and may be produced by subjecting the halogenated styrene or halogenated-α-methylstrene such as tribromostyrene to polymerization or by halogenating polystyrene or poly-α-methylstyrene.

Notably, the flame retarding agent of the general formula (I) can be used even if other vinyl group compounds are copolymerized therewith. Said vinyl group compounds include styrene, α-methylstyrene, acrylonitrile, methyl acrylate, butyl acrylate, methyl methacrylate, butadiene, vinyl acetate, etc.

The amount of addition of halogen containing polystyrene and/or halogen containing poly-α-methyl styrene represented by the general formula (I) is 3 to 45 parts by weight and more preferably, 5 to 40 parts by weight with respect to 100 parts by weight of thermoplastic polyester. If it is less than 3 parts by weight, sufficient flame retardancy is not obtained, while on the contrary, if it exceeds 45 parts by weight, the mechanical properties of the thermoplastic polyester are undesirably impaired.

The flame retarding effect of the halogen containing polystyrene and/or halogen containing poly-α-methyl styrene may be remarkably improved by the simultaneous addition thereto of (b) a third component antimony trioxide as a flame retarding assistant. The amount of addition thereof should be 1 to 20 parts by weight and more preferably, 3 to 18 parts by weight with respect to 100 parts by weight of thermoplastic polyester, and if it is less than 1 part by weight, the flame retardancy is not sufficient, while, if it exceeds 20 parts by weight, the mechanical properties of the thermoplastic polyester are undesirably impaired.

Still more preferably, it is desirable to add antimony trioxide at the rate of one antimony atom for every 2 to 5 halogen atoms in the added halogen containing polystyrene and/or halogen containing poly-α-methystyrene. Simultaneously, other flame retarding assistants such as boron oxide, zirconium oxide, iron oxide, etc. may be employed.

The composition prepared by mixing the flame retarding agent represented by the formula (I) and antimony trioxide with the thermoplastic polyester has a superior flame retardancy as compared with the conventional flame retarding polyesters. However, if an (c) epoxy compound is included in the composition as an additional component, further improvements in both mechanical properties (e.g., impact resistance, etc.,) and thermal stability may be achieved with simultaneous improvements in fluidity stabilization of the composition during molding in the fluid state.

As epoxy compounds which may be employed the present invention, there may be mentioned, for ample, epoxy ethers such as β,γ-epoxypropyl eth 1,4-bis(β,γ-epoxypropyl ether), 1,4-bis(β,γ-epc propoxy) butane, 1,6-bis(epoxy ethyl) hexane, 2,2-bi (β,γ-epoxypropoxy)phenyl]propane, 1-epoxyethyl-epoxycyclohexane, 1-(β,γ-epoxypropoxy)-2-benzyl yethane, 1-(β,γ-epoxypropoxy) 2-ethoxyethane, bis(β,γ-epoxypropoxy)benzene, etc., and epoxy es and their derivatives such as tetrahydrophthalic a diglycidyl ester, hexahydrophthalic acid diglyci ester, phthalic acid diglycidyl ester, dimer acid digly dyl ester, octadecanoic dicarboxylic acid diglyci ester, aliphatic acid monoglycidyl ester, etc., vari copolymers containing epoxy groups prepared by co lymerization of unsaturated monomers contain epoxy groups and other unsaturated monomers sucl ethylene/glycidyl methacryrate copolymer, etc.

Particularly, undecanoic carboxylic acid monogly dyl ester, tetrahydrophthalic acid diglycidyl es hexahydrophthalic acid diglycidyl ester, ethylen glycidyl methacrylate copolymer, and bis-glyci polyether (oligomer at quantity of 1 to 10) obtained the reaction between epichlorohydrin and 2,2-bi hydroxylphenol) propane (referred to as bis-phenol may be favorably employed.

The amount of addition of these epoxy compou should be in the range of 0.1 to 10 parts by weight more preferably, 0.2 to 9 parts by weight with respec 100 parts by weight of the thermoplastic polyester, if it is less than 0.1 part by weight, the improvemen mechanical properties, fluidity, etc., is small, while the contrary, if it exceeds 10 parts by weight, the fla retardancy is undesirably impaired. If desired, vari additives may be included in the composition of present invention such as fibrous or granular reinfor ments and fillers including glass fibers, glass bea carbon fibers, calcium carbonate, magnesium carb ates, barium sulfates, granular silicas, wollastoni talcs, clays, micas, sericities, zeolites, bentonites, dc mites, kaolinites, asbestos, feldspars and the like; anti idants and heat-stabilizers selected from hindered p nols, hydroquinones, thioethers, phosphites and the l ultraviolet absorbents selected from various substitu benzotriazoles, benzophenones, salicylates, resorcir and the like; lubricants and mold release agents selec from stearic acid, stearates, montanic acid, montan w montanates, stearyl alcohol, stearylamides such as e ylene bis(stearamide) and the like; coloring agents cluding dyes and pigments such as carbon black, t nium dioxide, cadmium sulfide and phthalocyanii another flame retardants selected from halogen s stitued aromatic compounds such as decarbromodip nyl ether, brominated polycarbonates, melamine cc pounds, cyanuric acid derivatives, phosphorus cc pounds and the like; nucleating agents and antiv agents and the like, as long as the characteristics of resulting compositions are not adversely affected. M than two of above mentioned additives can be adc Further, if desired, the following may be added to composition of the present invention: small amount thermoplastic resins such as polyethylenes, polypro enes, acrylic resins, fluoro-contaning polymers, poly etals, polycarbonates, polysulfones or p phenyleneoxides, thermosetting resins such as phen resins; melamine resins, unsaturated polyester res silicone resins or epoxy resins; and elastomeric ther plastic resins such as ethylene-vinylacetate-copolym ethylene-propyleneterpolymers, block-copolyetheresters and the like. More than the two types of the above mentioned resins may be added.

The composition of the present invention may be produced by conventional methods, which include, for example, the process in which the thermoplastic polyester, halogen containing polystyrene and/or halogen containing poly-α-methylstyrene, antimony trioxide, epoxy compound and other necessary additives are subjected to melting and mixing in an extruder or kneader; the process in which, after uniformly mixing granular materials with each other mechanically, molding is effected simultaneously with mixing by a direct injection molding machine; and another process in which the additives are directly charged into a polymerizing vessel of resin for mixing, etc.

In the above methods, although the addition may be effected in any order desired, it is preferable to mix the halogen containing polystyrene and/or halogen containing poly-α-methystyrene and antimony trioxide, after subjecting the thermoplastic polyester and epoxy compound to preliminary mixing.

The resinous composition of the present invention can be molded according to conventional methods such as extrusion molding, blow molding, injection molding and the like.

The molded products described above are not only favorable in the flame retardancy, but also superior in fluidity and thermal stability, with a good surface appearance, and therefore, useful for mechanical components, electrical parts, and parts for motor vehicles, etc.

The following examples are inserted for the purpose of illustrating the present invention, without any intention of limiting the scope thereof.

It is to be noted that, in the examples below, % and parts are all based on weight, and that, in the illustrative examples and comparative examples, the properties of the resinous composition are determined according to the following methods:

Relative viscosity:
With o-chlorophenol employed as a solvent, polymer solution at 25% is measured at 25° C.

Tensile property:
ASTMA D-636

Flammability:
UL-94 (vertical burning test)

Thermal stability:
Tensile strength maintaining rate (%) after subjecting the molded products to dry heat treatment at 190° C. for 15 days Fluidity:
Filling minium pressure (gauge pressure) during injection of the tensile molding piece is measured.

EXAMPLE 1

Polyethylene terephthalate (PET) with a relative viscosity of 1.35, flame retarding agent (A) as stated below, glass fibers (chopped strand of 3 mm in length), antimony trioxide (SBO), and bis-glycidy polyether of bisphenol A (EPIKOTE 815 made by Shell Company) were mixed by a V-blender at the rate shown in Table 1, and further melted for kneading at 280° C. by an extruder of 65 mmφ so as to be formed into pellets. After subjecting these pellets to vacuum drying at 130° C. for 5 hours, burning test pieces (⅛"×½"×5" and 1/32"×½"×5") and tensile dumbbell test pieces were molded at a molding temperature of 280° C. and a mold temperature of 130° C., and the minimum injection pressure at this time was recorded.

With the use of the above burning test pieces, the vertical burning test was effected according to UL-94 standard, while the tensile property test was made on the basis of ASTM D-638, the results of which are shown in Table 1.

Flame retarding agent (A)

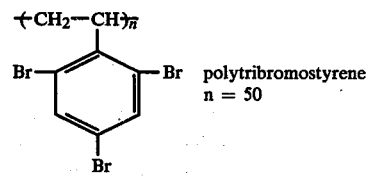

polytribromostyrene
n = 50

TABLE 1

| | Compositions | | | | Tensile property | | UL94 burning property | | Thermal stability | Minimum |
|---|---|---|---|---|---|---|---|---|---|---|
| PET (parts) | GF (parts) | Flame retarding agent (A) addition amount (parts) | SBO addition amount (parts) | Epoxy compound addition amount (parts) | Tensile strength (kg/cm²) | Elongation at break (%) | 1/32" | ⅛" | (Tensile strength maintaining rate %) | injection pressure kg/cm²G |
| EXAMPLES | | | | | | | | | | |
| 100 | 45 | 7 | 3 | 0.2 | 1410 | 3.1 | V-2 | V-2 | 92 | 12 |
| 100 | 45 | 14 | 5 | 0.5 | 1350 | 3.7 | V-2 | V-0 | 92 | 14 |
| 100 | 45 | 16 | 6 | 0.5 | 1330 | 3.5 | V-0 | V-0 | 90 | 14 |
| 100 | 45 | 16 | 6 | 1.0 | 1410 | 3.8 | V-0 | V-0 | 93 | 18 |
| 100 | 45 | 18 | 7 | 0.5 | 1115 | 3.1 | V-0 | V-0 | 87 | 14 |
| 100 | 45 | 21 | 9 | 0.5 | 1070 | 3.0 | V-0 | V-0 | 85 | 13 |
| Comparative examples | | | | | | | | | | |
| 100 | 45 | 0 | 0 | 0 | 1460 | 3.7 | HB | HB | 79 | 10 |
| 100 | 45 | 16 | 6 | 0 | 1210 | 2.6 | V-0 | V-0 | 77 | 7 |
| 100 | 45 | 18 | 0 | 0 | 1110 | 3.5 | V-2 | V-2 | 75 | 8 |

From the results of Table 1, it is clear that the composition according to the present invention has an excellent flame retardancy, moreover, it exhibits a superior balance of mechanical properties and fluidity.

EXAMPLE 2

35 parts by weight of glass fibers, 12 parts by weight of the flame retarding agent (A) employed in EXAMPLE 1, 5 parts by weight of antimony trioxide, and 1 part by weight of barium stearate were mixed with 100 parts by weight of polyethylene terephthalate (PET) with a relative viscosity of 1.35, with further addition thereto of various epoxy compounds as shown in Table 2 at the rate given in Table 2.

The polyethylene terephthalate, flame retarding agent (A), antimony trioxide, barium stearate, and epoxy compounds were mixed by the V-blender, with subsequent addition thereto of the glass fibers.

The mixture thus obtained was subjected to melting and kneeding at 280° C. and then formed into pellets by the 65 mm extruder. The resulting pellets were subject to the injection molding by the method of EXAMPLE 1 after drying to prepare the burning test pieces and dumbbell test pieces, which were measured for physical properties.

The result of the measurements are shown in Table 2.

TABLE 2

| Epoxy Compound (added amount) | Tensile properties | | UL94 flammability 1/32" |
|---|---|---|---|
| | Tensile strength (kg/cm$^2$) | Elongation at break (%) | |
| EPIKOTE 815 (0.5) | 1380 | 3.6 | V-0 |
| EPIKOTE 190 (made by Shell Company) (Tetrahydrophthalic acid diglycidyl ester) (0.5) | 1490 | 4.1 | V-0 |
| CARDURA E (made by Shell Company) (Undecanoic carboxylic acid monoglycidyl ester) (0.5) | 1320 | 3.4 | V-0 |
| Ethylene.glycidyl-methacrylate copolymer (3.0) | 1510 | 3.6 | V-0 |
| None | 1190 | 3.2 | V-0 |

From the results of Table 2, it is clear that the composition of the present invension is well balanced in the flammability and mechanical properties.

EXAMPLE 3

15 parts by weight of the flame retarding agent (A) as employed in EXAMPLE 1, 6 parts by weight of antimony trioxide (SBO), 0.1 part by weight of di-stearylpentaerythritol diphosphite (trade name HI-MO, made by Sanko Kagaku) and 0.5 part by weight of EPIKOTE 190 were mixed with 100 parts by weight of polybutylene terephthalate having a relative viscosity at 1.48, and 35 parts by weight of glass fibers.

With respect to the blending, polybutylene terephthalate pellets and flame retarding agent (A), antimony trioxide, di-stearylpentaerythritol diphosphite, and EPIKOTE190 were preliminarily mixed by the V-blender, then the glass fibers were mixed, paying particular attention so as not to excessively open said glass fibers.

The resultant mixture was melted and kneaded at 250° C. by the 65 mmφ extruder so as to be formed into pellets. The pellets thus obtained were formed after drying, into the burning test pieces (1/32") and dumbbell test pieces at a molding temperature of 250° C. and a mold temperature of 80° C.

Measurements of the flammability and tensile properties were performed as in EXAMPLE 1, and a tensile strength of 1360 kg/cm$^2$ and UL94 flammability of V-0 were obtained, with the minimum injection pressure of 17 kg/cm$^2$G and thermal stability of 86%.

As a result of similar tests made on the composition to which EPIKOTE190 was not added, the flammability was V-0, but the tensile strength was reduced to 1210 kg/cm$^2$ with simultaneous decrease of the minimum injection pressure to 9 kg/cm$^2$G and that of the thermal stability to 73%.

EXAMPLE 4

100 parts by weight of polybutylene terephthalate with a relative viscosity of 1.70, 17 parts by weight of the flame retarding agent (A) employed in EXAMPLE 1, 7 parts by weight of antimony trioxide, 0.1 part by weight of thiodistearylpropionate (trade name "Sumilizer TPS", made by Sumitomo Kagaku), and 0.6 parts by weight of CARDURA E as epoxy compound were mixed at the above rate.

With respect to the blending, the V-blender was employed, and the resultant mixture was melted and kneaded at 250° C. with the use of a 30 mmφ extruder to be formed into pellets. After having beed dried in hot air at 130° C. for 5 hours, the pellets were formed into the burning test pieces (⅛") and dumbbell test pieces at a molding temperature of 250° C. and a mold temperature of 80° C. Upon subjecting the test pieces to the tensile property tests and UL94 flammability tests described in EXAMPLE 1, the tensile strength of 580 kg/cm$^2$, elongation at break of 40% and UL94 flammability of V-0 were obtained.

When the physical property tests were made on the composition without addition of CARDURA E in the similar manner, the flammability was still V-0, but the tensile strength was lowered to 560 kg/cm$^2$, with simultaneous reduction of the elongation at break to 20%.

What is claimed is:

1. A flame retarding polyester composition which comprises (a) 3 to 45 parts by weight of a halogen containing polystyrene and/or a halogen containing poly-a-methystyrene represented by formula (I) given below, (b) 1 to 20 parts by weight of antimony trioxide, and (c) 0.1 to 10 parts by weight of epoxy compound which are mixed with 100 parts by weight of a thermoplastic polyester selected from the group consisting of polyethylene terephthalate and polybutylene terephthalate,

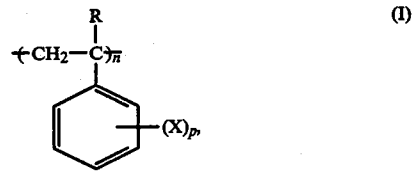

wherein R represents a hydrogen atom or methyl group, X represents a bromine or chlorine atom, p is an integer of 1 to 5, and n is an integer larger than 2.

2. A flame retarding polyester composition as claimed in claim 1, wherein said halogen containing polystyrene is a polytribromostyrene.

3. A flame retarding polyester composition as claimed in claim 1 or 2, wherein the total amount of halogen containing polystyrene and/or halogen containing poly-α-methylstyrene is in the range of 5 to 40 parts by weight.

4. A flame retarding polyester composition as claimed in claim 1, wherein the epoxy compound is glycidyl esters of aliphatic acids or cycloaliphatic carboxylic acids.

5. A flame retarding polyester composition as claimed in claim 1, wherein the epoxy compound is bisglycidyl ether of bisphenol A.

6. A flame retarding polyester composition as claimed in claim 1, wherein said epoxy compound is ethylene/glycidyl methacrylate copolymer.

7. A flame retarding polyester composition as claimed in claim 1, 4, 5 or 6, wherein the amount of addition of the epoxy compound is in the range of 0.2 to 9 parts by weight.

8. A flame retarding polyester composition as claimed in claim 1, further containing fibrous and/or granular reinforcement.

9. A flame retarding polyester composition as claimed in claim 8, wherein said reinforcement is glass fibers.

* * * * *